Figure 1:
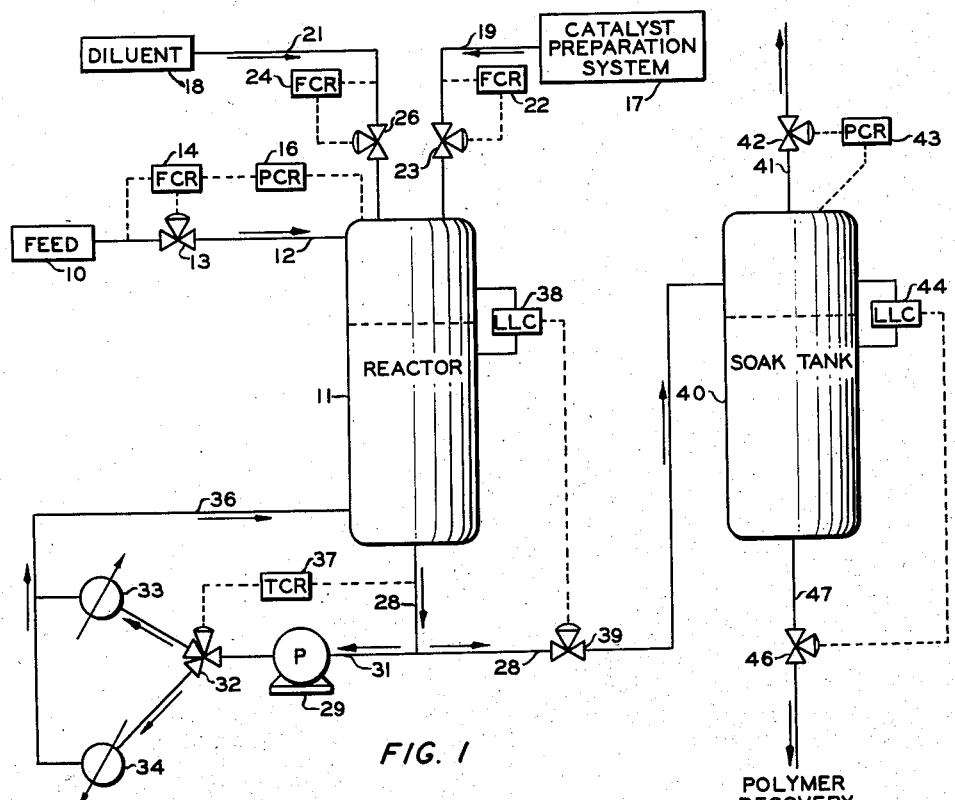

INVENTORS.
C. W. MERTZ
P. F. WARNER
BY

ATTORNEYS

INVENTORS.
C. W. MERTZ
P. F. WARNER
BY Hudson & Young
ATTORNEYS

United States Patent Office 2,886,616
Patented May 12, 1959

2,886,616

CONTROL OF POLYMERIZATION PROCESSES

Clyde W. Mertz, Bartlesville, Okla., and Paul F. Warner, Borger, Tex., assignors to Phillips Petroleum Company, a corporation of Delaware Application August 24, 1955, Serial No. 530,230

5 Claims. (Cl. 260—683.15)

This invention relates to a process for the polymerization of polymerizable organic compounds. In one of its more specific aspects, it relates to a method for controlling a catalyzed polymerization reaction having a vapor and a liquid phase. In another of its more specific aspects, it relates to a catalyzed polymerization process in which a polymer product is produced at a substantially constant rate. In still another of its more specific aspects it relates to the polymerization of butadiene in the presence of an alkali metal catalyst. In yet another aspect of the invention, it relates to a method for controlling the rate of introducing feed into a polymerization zone.

In the polymerization of unsaturated organic compounds in the presence of a polymerization catalyst, the reaction rate of any particular polymerization reaction is dependent upon several process variables, e.g., the concentration of the organic compound in the reaction mixture, the reaction temperature and the catalyst activity. In order to obtain a uniform product of desired composition, it becomes necessary to maintain close control over certain of these process variables. For example, it is important that the feed introduction rate be controlled so as to maintain a desired concentration of organic compound in the reaction mixture. Furthermore, it would be desirable to be able to compensate for any change in the reaction rate caused by fluctuations in one process variable by changing another variable so as to maintain a substantially uniform reaction rate. Still again, it would be a distinct advantage in practicing a polymerization process if the process variables could be controlled so that the rate of product formation will remain substantially constant. In one proposed method of control, the rate of feed introduction is controlled in accordance with the temperature of the reaction mixture. This method of control has, however, proved unsatisfactory because the reaction temperature is not always responsive to changes in the feed rate. In accordance with the present invention, a method for controlling catalyzed polymerization processes is provided whereby the desirable results as discussed above are attained.

The following are objects of the invention.

It is an object of the invention to provide an improved process for the catalyzed polymerization of polymerizable organic compounds.

Another object of the invention is to provide an improved method for controlling the reaction rates of catalyzed polymerization processes.

Yet another object of the invention is to provide a method for controlling the feed introduction rate in a catalyzed polymerization process.

Still another object of the invention is to provide a catalyzed polymerization process wherein the rate of product formation remains substantially constant.

A further object of the invention is to provide instrumentation for the control of catalyzed polymerization processes.

A still further object of the invention is to provide an improved process for the polymerization of butadiene in the presence of an alkali metal catalyst.

Yet a further object of the invention is to provide means and a method for controlling the feed introduction rate so that the cooling capacity of a polymerization reactor is not exceeded during conduct of a polymerization process.

Another object of the invention is to provide a method and means for controlling the feed introduction rate during a polymerization process so that the aforementioned rate does not exceed a desired maximum.

Still other and further objects and advantages of the invention will become apparent to one skilled in the art upon consideration of the following disclosure.

Broadly speaking, the present invention resides in controlling the feed introduction rate of a catalyzed polymerization process in which the polymerization is carried out in a closed polymerization zone having a vapor phase and a liquid phase by adding the feed to the reactor at a rate sufficient to maintain a constant predetermined pressure in the polymerization zone. In one modification of the invention, a pressure controller recorder operatively connected to a polymerization reactor controls the rate of feed addition by resetting a flow controller recorder. In another modification of the invention, the rate of feed addition to the polymerization reactor is controlled by a pressure controller recorder which is operatively connected to the reactor. The pressure controller recorder is provided with a set mechanism which operates to reset the control index of the pressure controller-recorder in accordance with the rate of product withdrawal from the reactor. In accordance with still another modification of the invention, the control index of the pressure controller recorder is reset in accordance with the temperature of the reaction mixture contained in the polymerization reactor. In yet another modification of the invention, the control index of the pressure controller recorder is reset in accordance with the rate of flow of feed through the feed inlet line to the polymerization reactor.

This invention in general is applicable to the control of any catalyzed polymerization reaction having a vapor phase comprising a polymerizable organic compound and a liquid phase comprising dissolved polymerizable organic compound, a polymerization catalyst and an inert diluent. For example, it can be employed in conjunction with the mass polymerization of conjugated diolefins such as 1,3-butadiene or isoprene in the presence of an alkali metal catalyst, particularly sodium and potassium. Still again, it can be used in controlling processes for the polymerization of low boiling olefin hydrocarbons such as ethylene, propylene, butylenes, pentenes and mixtures thereof in the presence of various catalysts, e.g., phosphoric acid catalyst and catalysts of the silica-alumina type such as nickel-oxide-silica-alumina.

Figure 3:
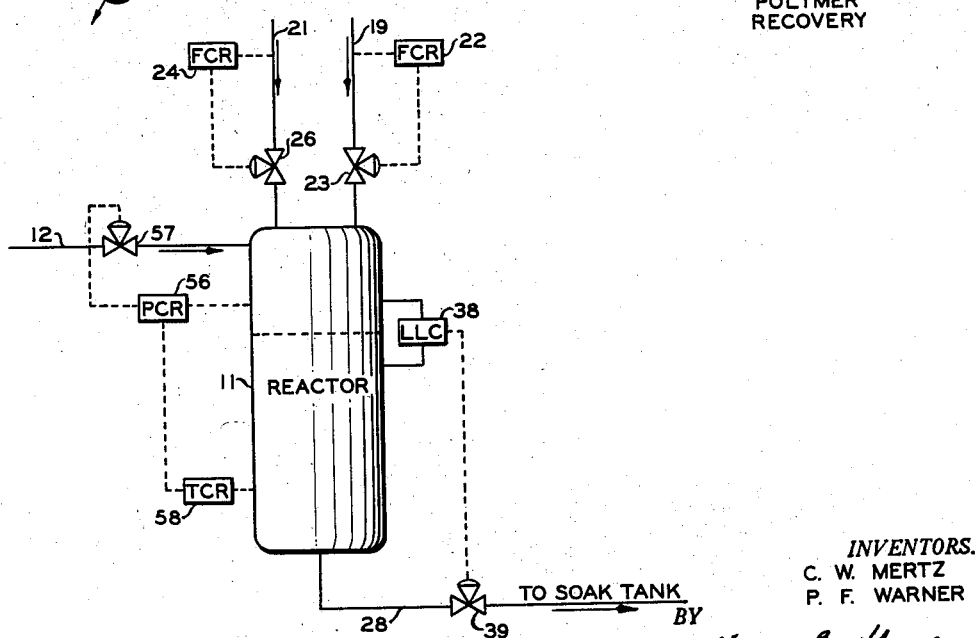
Figure 2:
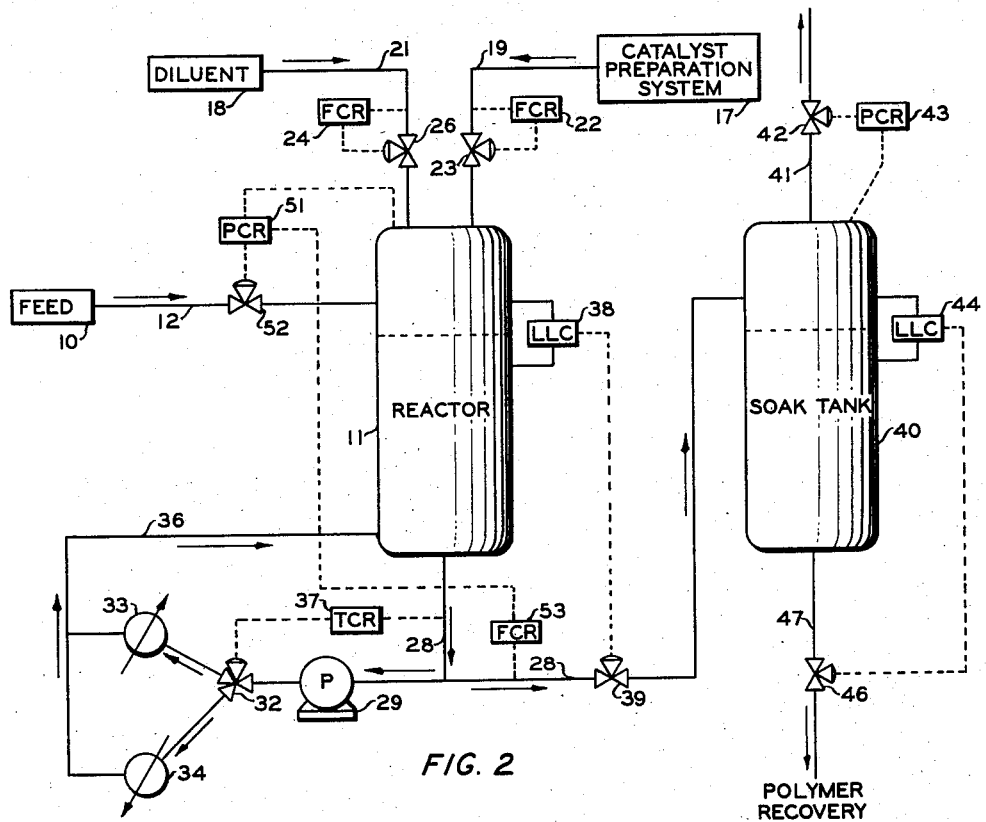
Figure 4:
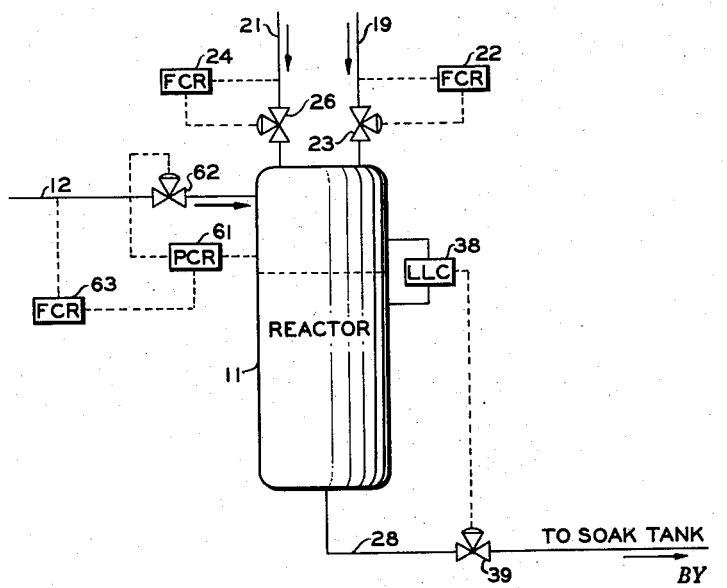

A more complete understanding of the invention may be obtained from the following discussion and the drawing, in which:

Figure 1 illustrates diagrammatically an arrangement of apparatus suitable for practicing one modification of the invention; and Figures 2, 3 and 4 illustrate diagrammatically arrangements of apparatus suitable for practicing other modifications of the invention.

While the invention as discussed hereinafter is specific to the polymerization of 1,3-butadiene it is to be understood that it is not intended to so limit the invention. Thus, the invention is applicable to any polymerization process in which there is a great difference in the volatility of the polymerizable organic compound and the other components in the reaction mixture so that substantially all of the pressure of the reaction is contributed by the polymerizable organic compound. Furthermore, although the invention is described herein with relation to a continuous polymerization process, it is applicable as well to batch polymerization processes.

Referring now to Figure 1 of the drawing, butadiene feed from storage tank 10 is charged to reactor 11 through feed inlet line 12 containing a flow control means such as motor valve 13. Motor valve 13 is operatively connected to flow controller recorder 14 which is provided with a pneumatic set mechanism and is further operatively connected to feed inlet line 12. Control instruments suitable for use in the practice of this invention may be obtained from Taylor Instrument Companies, Rochester, New York, or The Brown Instrument Company, Philadelphia, Pennsylvania. Pressure controller recorder 16 is operatively connected to reactor 11 and to the set mechanism of flow controller recorder 14. The isomeric diolefin, 1,2-butadiene, and other deleterious materials are removed prior to passing the butadiene feed stream into the reactor, the butadiene preferably having a purity of at least 98 weight percent with a maximum of 2.0 percent of impurities. Simultaneously with the introduction of butadiene feed, a finely divided suspension of alkali metal catalyst from catalyst preparation system 17 and an inert diluent from storage tank 18 are introduced into reactor 11 through lines 19 and 21, respectively. The rate of catalyst introduction is controlled by a flow controller recorder 22 operatively connected to line 19 and to flow control means 23 contained in this line. The amount of catalyst generally will not exceed 2.0 parts by weight alkali metal per 100 parts butadiene feed charged, and is preferably in the range of 0.5 to 1.5 parts per 100 parts butadiene. The rate of diluent introduction is controlled by flow controller recorder 24 operatively connected to line 21 and to flow control means 26 contained in this line. Diluents wehich are suitable for use have a boiling point above the polymerization temperature and include the normally liquid paraffinic hydrocarbons such as heptanes and octanes and aromatic hydrocarbons such as toluene.

The catalyst employed comprises finely divided suspensions of alkali metals such as sodium and potassium. The preparation of the catalyst involves charging a dispersion medium such as xylene to any conventional type of mixing vessel where it is heated to a temperature above the melting point of the alkali metal, e.g., in the case of sodium between about 212° F. and 240° F. in an atmosphere of dried, oxygen-free nitrogen, after which the freshly cut metal such as sodium is added. The temperature is adjusted to about 230° F. and the mixture is then vigorously agitated for a period ranging from about 5 to 15 minutes or until a stable dispersion is produced. The system is allowed to cool to about 212° F. when agitation is terminated. A catalyst thus prepared is ready for introduction into the reactor as described hereinbefore. If desired a dispersion stabilizer, e.g., a selected mercaptan such as tertiary dodecyl mercaptan or carbon black may be used in the preparation of the catalyst. A method which can be advantageously used for preparing a dispersion of alkali metal in a dispersing medium is described in detail by P. F. Warner in copending U.S. application, Serial No. 478,618, filed December 30, 1954.

In the reactor the mixture is maintained intimately admixed by suitable stirring means, not shown, at a reaction temperature for a time sufficient to effect the desired extent of conversion of butadiene to liquid polybutadiene. In the polymerization of 1,3-butadiene, the reaction is carried out at a temperature in the range from about 140° F. to 230° F. with a temperature between about 185° F. and 212° F. being preferred. During the polymerization, the reaction temperature is maintained substantially constant by removing heat of reaction. This heat removal may be accomplished in several ways as by external cooling or by internal cooling coils. As shown in Figure 1, the reaction temperature is maintained constant by recycling a portion of the reaction mixture withdrawn from the reactor through line 28. Thus, a portion of the reaction mixture is pumped by pump 29 through line 31, proportioning valve 32, through either heater 33 or cooler 34 and thence into reactor 11 through line 36. The positioning of the proportioning valve is controlled by temperature controller recorder 37 which is operatively connected to the valve and to line 28. Temperature controller recorder 37, which is given a setting corresponding to the desired reaction temperature, operates to position valve 32 so that the correct proportion of the reaction mixture is passed through heater 33 or cooler 34 to maintain the temperature within the reactor at the given setting. While temperature controller recorder 37 is shown as being operatively connected to line 28, it is within the contemplation of the invention to connect the controller recorder to the reactor itself or to line 36. By using both a heater and a cooler, it is possible to control the reaction temperature within very narrow limits. The rate of circulation of material through the temperature control circuit is very high, it being desirable to circulate the entire contents of the reactor within a period of from about 5 to about 10 minutes.

As previously mentioned, the polymerization reaction is carried out in a closed reactor in which there exists both a vapor phase and a liquid phase. Reactor 11 is maintained at less than liquid full by means of liquid level controller 38 which is operatively connected to flow control means 39 contained in outlet line 28. The reaction products are withdrawn at such a rate that the desired liquid level is maintained at all times in the reactor so that there is present in the reactor a vapor phase comprising butadiene and a liquid phase comprising dissolved butadiene, suspended polymerization catalyst, inert diluent, and polymer.

In the polymerization it is important that the operation of the reactor be stabilized so as to maintain a substantially constant concentration of butadiene in the reaction mixture. This is accomplished in accordance with this invention by controlling the rate of feed introduction so that the reactor pressure remains substantially constant. In a system such as herein described where there is a great difference in the volatility of the polymerizable organic feed compound and the other components in the reaction mixture, substantially all of the pressure of the reaction is supplied by the polymerizable compound, in this case butadiene. And since the concentration of butadiene in the liquid phase is dependent upon the reactor pressure, it has been found that a substantially constant concentration of butadiene can be maintained by supplying the butadiene feed to the reactor at such a rate that a predetermined pressure is maintained therein. Operation in this manner also prevents the build-up of an excessive pressure in the reactor. Thus, referring still to Figure 1, flow controller recorder 14 is originally given a setting such that the rate of flow of butadiene to the reactor will maintain a predetermined pressure therein as recorded by pressure controller recorder 16. The pressure in the reactor will be maintained from not much above atmospheric when butadiene is being polymerized rapidly by a very active catalyst up to several atmospheres when a less active catalyst is used. After the original setting of flow controller recorder 14, pressure controller recorder 16 operates through the pneumatic set mechanism to reset the control index of the flow controller recorder so as to vary the rate of feed introduction and thereby maintain the pressure within the reactor at the desired predetermined pressure. Thus, if the reaction rate should decline for some reason, such as a change in catalyst activity, the pressure within the reactor will tend to increase because of the build up within the reactor of unreacted butadiene. Pressure controller recorder 16 then operates in cooperation with the set mechanism to reset the control index of flow controller recorder 14, cutting back on the rate of feed introduction until the pressure within the reactor returns to its predetermined value. Accordingly, butadiene is supplied to the reactor at such a rate that the pressure within the reactor is maintained substantially constant. In the event that the reaction rate should increase so that the pressure within the reactor decreases, pressure controller recorder 16 operates to reset the control index of flow controller recorder 14 to a higher value. The rate of feed introduction is thereby increased until the pressure within the reactor returns to its predetermined value. It is thus apparent that when the reaction rate increases or decreases, there occurs a corresponding increase or decrease in the rate of butadiene addition with the result that the concentration of butadiene in the reaction mixture remains substantially constant during the polymerization.

The reaction mixture is removed through line 28 at a rate dependent upon the setting of flow control means 39 and then introduced into soak tank 40. The reaction mixture remains within soak tank 40 for a time sufficient to allow additional polymerization of unreacted butadiene contained in the mixture to take place. Butadiene in gaseous form is removed from the soak tank through line 41 at a rate dependent upon the setting of flow control means 42. As illustrated, flow control means 42 is connected to pressure controller recorder 43 which is further operatively connected to soak tank 40. Pressure controller recorder 43 operates to control flow control means 42 so that butadiene is removed from the soak tank at such a rate that the pressure within the tank is maintained at about atmospheric. Soak tank 40 is maintained at less than liquid full by means of liquid level controller 44 which is operatively connected to flow control means 46 contained in outlet line 47. Through the operation of the liquid level controller and flow control means 46 the reaction mixture is withdrawn from the soak tank at such a rate that a desired liquid level is maintained within that tank.

After removal of the reaction mixture through line 47, the mixture is passed to a polymer recovery system. The polymer recovery system will comprise cooling and heating devices, fractionating equipment, decantation and filtration equipment or the like whereby the alkali metal catalyst and diluent contained in the reaction mixture may be separated from the polymer. It is also within the scope of the invention to omit the soak tank in which case the reaction mixture removed from reactor 11 through line 28 is passed directly to the polymer recovery system.

Referring to Figure 2 of the drawing, there is illustrated an arrangement of apparatus suitable for practicing a modification of the invention. Identical reference numerals have been used to designate elements corresponding to those described in conjunction with Figure 2. Except for the control of the reaction, the polymerization is carried out in the same manner as described hereinabove. Pressure controller recorder 51, which is provided with a pneumatic set mechanism, is operatively connected to reactor 11 and to flow control means 52, such as a motor valve, contained in feed inlet line 12. A flow controller recorder 53 is operatively connected to outlet line 28 and to the set mechanism of pressure controller recorder 51. Controller recorder 51 is given an original pressure setting at which it is desired to carry out the polymerization, and the instrument thereafter operates valve 52 so that butadiene is introduced into the reactor at the rate necessary to maintain this predetermined pressure. If the reaction rate should decline for some reason, e.g., because of a change in catalyst activity, then the pressure within the reactor will increase because of a build up of unreacted butadiene therein. Because of this increase in pressure, pressure controller recorder 51 will actuate valve 52 so as to cut back on the rate of feed introduction, thereby maintaining the pressure at its predetermined value. Because of this sequence of events resulting in a decrease in the rate of feed introduction, the rate of flow of reaction materials in outlet line 28 decreases as indicated by flow controller recorder 53. As a result of the decreased flow rate in line 28, the flow controller recorder in cooperation with the set mechanism of pressure controller recorder 51 operates to reset the control index of the controller recorder to a higher pressure setting. Because of this increase in the setting of the pressure controller recorder, the rate of butadiene introduction is increased, thereby causing the concentration of butadiene in the reaction mixture to increase and concomitantly an increase in the rate of flow of material in outlet line 28. When the rate of flow of material in line 28 reaches a rate of flow corresponding to the original setting of the pressure controller recorder, the set mechanism operates to return the control index of the pressure controller-recorder to its original setting. If conditions exist which cause an increase in reaction rate to take place, a cycle of events opposite to that just described occurs. By providing the pressure controller recorder with a rate of flow override, it is possible to obtain steady production rates by compensating for small changes in reaction rates resulting from variations in process variables.

Referring to Figures 3 and 4 of the drawing, there are illustrated two other modifications of the invention which are somewhat similar. Identical reference numerals have been utilized to designate elements corresponding to those described in conjunction with Figure 1. While means for maintaining a constant temperature within the reactor is not shown, it is assumed that a temperature control means similar to that illustrated in Figures 1 and 2 would be used. Furthermore, the polymerization process is carried out in essentially the same manner as described in conjunction with Figure 1 except for the differences in the method of controlling the polymerization.

In Figure 3 of the drawing, pressure controller recorder 56 provided with a pneumatic set mechanism is operatively connected to reactor 11 and to flow control means 57, such as a motor valve. A temperature controller recorder 58 is operatively connected to reactor 11 and to the set mechanism of pressure controller recorder 56. Pressure controller recorder 56 is given an original setting corresponding to the pressure which it is desired to maintain within reactor 11. The pressure controller recorder then operates to control valve 57 so that butadiene feed is introduced into the reactor at a rate sufficient to maintain the desired predetermined pressure.

As previously discussed in conjunction with the description of Figure 1, the temperature of the reaction mixture is maintained substantially constant during the polymerization reaction. In certain cases, however, it may happen that the reaction temperature will vary from that desired, and it is in this situation that temperature controller recorder 58 comes into operation. Accordingly, temperature controller recorder 58 is given a setting slightly higher than the desired reaction temperature, e.g., about 1 to 5 degrees higher. Thus, if the temperature of the reaction mixture begins to rise above the desired controlled temperature, temperature controller recorder 58 operates in conjunction with the reset mechanism of the pressure controller recorder to reset the control index of the pressure controller recorder at a lower value. As a result of resetting the control index of the pressure controller recorder to a lower value, the rate of introduction of butadiene into the reactor is decreased, thereby causing a decreased polymerization rate until such time as the temperature of the reaction mixture returns to normal. The original setting is then restored to the pressure controller recorder through the operation of its set mechanism and temperature controller recorder 58.

In Figure 4 of the drawing, pressure controller recorder 61 provided with a pneumatic set mechanism is operatively connected to reactor 11 and to flow control means 62, such as a motor valve, contained in feed inlet line 12. A flow controller recorder 63 is operatively connected to feed inlet line 12 and to the set mechanism of pressure controller recorder 61. Pressure controller recorder 61 operates similarly to pressure controller recorder 56 of Figure 3 to maintain a desired predetermined pressure within reactor 11. Flow controller recorder 63 is given a setting corresponding to the maximum rate at which it is desired to introduce butadiene into reactor 11. At rates of flow below the setting of flow controller recorder 63, pressure controller recorder 61 operates in its normal manner to control the setting of valve 62 so that butadiene feed is introduced into the reactor at a rate sufficient to maintain therein the desired predetermined pressure. If the rate of flow of feed material in line 12 rises above the rate of flow setting of flow controller recorder 63, this instrument operates in conjunction with the set mechanism of pressure controller recorder 61 to decrease the pressure setting of the control index. As a result of the decrease in the pressure setting, pressure controller recorder 61 operates through valves 62 to decrease the rate of introduction of feed into reactor 11. When the rate of flow of material in line 12 reaches a value below the setting of flow controller recorder 63, the control index of pressure controller recorder 61 is returned automatically to its original setting and feed is now introduced into the reactor at a rate corresponding to the original setting of the pressure controller recorder. By providing a rate of flow control to override the basic pressure control instrument, it is possible to place limits on the rate of feed introduction. By so utilizing an override, it is possible to control the rate of feed introduction so that it will not become so rapid that the cooling capacity of the reactor will be exceeded.

A more complete understanding of the invention may be obtained by referring to the following illustrative examples which are not intended, however, to be unduly limitative of the invention.

*Example I*

In a batch type operation, 45 gallons of normal heptane was charged to a 100 gallon, jacketed reactor and heated to 200° F. The reactor was flushed twice with butadiene after which 1.5 gallons of xylene containing 2.2 pounds dispersed sodium catalyst were charged to the reactor. The initial charge of about 10 pounds of butadiene was next added to the reactor. The reactor temperature was held at 200° F. until the reaction started as indicated by both a rapid increase in temperature to between 220° F. and 230° F. and a decrease in pressure. As soon as the reaction temperature was brought back to between 200 and 210° F., butadiene was fed to the reactor at such a rate as to maintain a constant pressure of 20 p.s.i.g. When 200 pounds of butadiene had been added, the feed was shut off. After about 10 minutes to allow completion of the reaction, the catalyst was rendered inactive by addition of 1 gallon of methanol. The reaction mixture was then passed to a product recovery system from which the product polybutadiene was recovered.

*Example II*

Butadiene was polymerized using apparatus similar to that shown in Figure 1. However, the soak tank shown in the figure was not used, the reactor effluent being passed directly to the product recovery system. Furthermore, the pressure controller was operatively connected to a small motor valve positioned in the air line connecting the flow controller to the motor valve in the feed inlet line to the reactor. Normal heptane was charged to the reactor at the rate of 300 pounds per hour. One and one-half gallons of xylene containing 2.2 pounds of dispersed sodium were fed to the reactor each hour. Under normal operation the butadiene feed was on flow control, and a pressure of 20 p.s.i.g. was maintained in the reactor. The pressure controller was given a setting corresponding to this value. Whenever the reactor pressure increased above 20 p.s.i.g., air from the pressure controller opened the small motor valve in the air line connecting the flow controller to the motor valve in the feed inlet line. This latter valve was thereby closed and remained closed until the reactor pressure dropped to 20 p.s.i.g. At this time the small motor valve closed and butadiene feed was resumed at the normal flow rate. The reactor effluent was removed at a rate of about 502 pounds per hour. At this withdrawal rate, the reactant materials had an average residence time of 1 hour. The reactor effluent was then passed to a product recovery system from which the product polybutadiene was recovered.

It will be apparent to those skilled in the art that variations and modifications of the invention can be made upon study of the foregoing disclosure. Such modifications are believed to be clearly within the spirit and scope of the invention.

We claim:

1. In a process for the polymerization of a polymerizable organic compound in the presence of a polymerization catalyst wherein said polymerization is carried out at a substantially constant polymerization temperature in a closed polymerization zone having a vapor phase comprising said organic compound and a liquid phase comprising said organic compound, said polymerization catalyst and an inert diluent, the improvement which comprises introducing said organic compound into said polymerization zone so as to maintain a fixed value of pressure therein; measuring the rate at which polymeric material is withdrawn from said polymerization zone; changing said fixed value of pressure in accordance with the measured rate of withdrawal of polymeric material; and regulating the supply of organic material to said polymerization zone so as to maintain the pressure therein at its changed value.

2. Apparatus for use in the polymerization of a polymerizable organic compound which comprises, in combination, a closed reaction vessel; means for introducing a controlled amount of catalyst into said vessel; means for introducing a controlled amount of an inert diluent into said vessel; a feed inlet conduit connected to the upper portion of said vessel; a first flow control means in said feed inlet conduit; a pressure control means having a control index, operatively connected to the upper portion of said vessel and to said first flow control means; an outlet conduit connected to the lower portion of said vessel; a second flow control means in said outlet conduit; a liquid level controller operatively connected to said vessel and to said second flow control means; means for resetting the control index of said pressure control means in accordance with the rate of withdrawal of reaction material through said outlet conduit; and means for maintaining a substantially constant polymerization temperature within said vessel.

3. The process of claim 1 in which the polymerizable organic compound is a low boiling olefin hydrocarbon.

4. The process of claim 1 in which the polymerizable organic compound is a conjugated diene and the polymerization catalyst is an alkali metal catalyst.

5. The process of claim 4 in which the conjugated diene is 1,3-butadiene.

References Cited in the file of this patent

UNITED STATES PATENTS

| | | |
|---|---|---|
| 2,373,888 | Hachmuth | Apr. 17, 1945 |
| 2,462,992 | Ritzmann | Mar. 1, 1949 |
| 2,474,583 | Lewis | June 28, 1949 |
| 2,486,533 | Mayland et al. | Nov. 1, 1949 |
| 2,606,940 | Bailey et al. | Aug. 12, 1952 |
| 2,631,175 | Crouch | Mar. 10, 1953 |
| 2,735,803 | Leffer | Feb. 21, 1956 |
| 2,780,617 | Zletz | Feb. 5, 1957 |
| 2,792,501 | Barton | May 14, 1957 |